(12) United States Patent
Gupta Hyde et al.

(10) Patent No.: US 10,492,142 B2
(45) Date of Patent: Nov. 26, 2019

(54) LOW-POWER WAKEUP RADIO FOR MOBILE DEVICES

(71) Applicant: Intel Corporation, Santa Clara, CA (US)

(72) Inventors: Maruti Gupta Hyde, Portland, OR (US); Minyoung Park, San Ramon, CA (US); Kathiravetpillai Sivanesan, Portland, OR (US); Vallabhajosyula S. Somayazulu, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/758,902

(22) PCT Filed: Sep. 25, 2015

(86) PCT No.: PCT/US2015/052257
§ 371 (c)(1),
(2) Date: Mar. 9, 2018

(87) PCT Pub. No.: WO2017/052596
PCT Pub. Date: Mar. 30, 2017

(65) Prior Publication Data
US 2018/0255515 A1    Sep. 6, 2018

(51) Int. Cl.
*H04W 52/02*    (2009.01)
*H04W 88/08*    (2009.01)
(Continued)

(52) U.S. Cl.
CPC .......... *H04W 52/0235* (2013.01); *H04B 1/04* (2013.01); *H04B 1/16* (2013.01);
(Continued)

(58) Field of Classification Search
CPC . H04W 52/0235; H04W 88/08; H04W 52/02; H04W 88/02; H04M 1/73;
(Continued)

(56) References Cited

U.S. PATENT DOCUMENTS

| 9,313,739 | B2 * | 4/2016 | Jafarian ............ H04W 52/0235 |
| 2010/0002614 | A1 | 1/2010 | Subrahmanya |
| 2014/0247781 | A1 | 9/2014 | Somasundaram et al. |

FOREIGN PATENT DOCUMENTS

| CN | 102487541 A | 6/2012 |
| WO | WO-2013112733 A1 | 8/2013 |

OTHER PUBLICATIONS

Yu, Liu, "Performance analysis of adjustable discontinuous reception (DRX) mechanism in LTE network", Wireless and Optical Communication Conference (WOCC), 2014 23rd, [Online] Retrieved from the internethttp: ieeexplore.ieee.org xpl articleDetails.jsp?arnumber=6839948andnewsearc t=trueandqueryText=eNB%20UE%20low%20power%20wake%20up, (May 9, 2014), 1-6.
(Continued)

*Primary Examiner* — Eugene Yun
(74) *Attorney, Agent, or Firm* — Schwegman Lundberg & Woessner, P.A.

(57) ABSTRACT

Described herein are various wake-up procedures for user equipments (UEs). A UE may include a low power wake-up radio (LP-WUR) separate from a front end module (FEM). The LP-WUR may remain awake continuously (or at high-frequency intervals) and monitor for a wakeup signal, allowing the FEM to remain powered down in the absence of downlink data. When the LP-WUR detects a wakeup signal configured for the LP-WUR, the LP-WUR may be configured to wake up the FEM to receive incoming downlink data. Various network components may be configured to ensure UEs with LP-WURs receive corresponding wake-up signals.

10 Claims, 10 Drawing Sheets

(51) Int. Cl.
  *H04B 1/04* (2006.01)
  *H04B 1/16* (2006.01)
  *H04B 7/26* (2006.01)
  *H04M 1/73* (2006.01)
  *H04W 88/02* (2009.01)

(52) U.S. Cl.
  CPC ............... *H04B 7/26* (2013.01); *H04M 1/73* (2013.01); *H04W 52/02* (2013.01); *H04W 88/08* (2013.01); *H04W 88/02* (2013.01); *Y02D 70/1224* (2018.01); *Y02D 70/1242* (2018.01); *Y02D 70/1262* (2018.01); *Y02D 70/1264* (2018.01); *Y02D 70/142* (2018.01); *Y02D 70/144* (2018.01); *Y02D 70/146* (2018.01); *Y02D 70/21* (2018.01); *Y02D 70/22* (2018.01); *Y02D 70/23* (2018.01); *Y02D 70/24* (2018.01); *Y02D 70/26* (2018.01); *Y02D 70/449* (2018.01)

(58) Field of Classification Search
  CPC ... H04B 7/26; H04B 1/16; H04B 1/04; Y02D 70/22; Y02D 70/449
  USPC .......................................................... 455/574
  See application file for complete search history.

(56) References Cited

OTHER PUBLICATIONS

"International Application Serial No. PCT/US2015/052257, International Search Report dated Jun. 23, 2016", 9 pgs.
"International Application Serial No. PCT/US2015/052257, Written Opinion dated Jun. 23, 2016", 5 pgs.
Yu, Liu, et al., "Performance analysis of adjustable discontinuous reception (DRX) mechanism in LTE network", Wireless and Optical Communication Conference (WOCC), 2014 23rd, [Online] Retrieved from the internet <http://ieeexplore.ieee.org/xpl/articleDetails.jsp?arnumber=6839948&newsearct=true&queryText=eNB%20UE%20low%20power%20wake%20up>, (May 9, 2014), 1-6.

* cited by examiner

LOW-POWER WAKEUP RADIO FOR MOBILE DEVICES

This application is a U.S. National Stage Filing under 35 U.S.C. 371 from International Application No. PCT/US2015/052257, filed Sep. 25, 2015 and published in English as WO 2017/052596 on Mar. 30, 2017, which is incorporated herein by reference in its entirety.

TECHNICAL FIELD

Embodiments pertain to wireless communications. Some embodiments relate to user equipment (UE)-Evolved Node-B (eNodeB) signaling information.

BACKGROUND

Wireless mobile devices or user equipments (UEs) may communicate with each other using radio access technologies such as the 3GPP Long-Term Evolution (LTE) standard, 3GPP LTE Advanced Release 12 (March 2014) (the "LTE-A Standard"), the IEEE 802.16 standard, IEEE Std. 802.16-2009, published May 29, 2009 ("WiMAX"), as well as any other wireless protocols that are designated as 3G, 4G, 5G, and beyond. Technologies such as device-to-device (D2D), sensor networks, or Internet of Things (IoT) (which describes interconnecting uniquely identifiable embedded computing devices within the internet infrastructure) can utilize UEs comprising limited power supplies.

DETAILED DESCRIPTION

The following description and the drawings sufficiently illustrate specific embodiments to enable those skilled in the art to practice them. Other embodiments can incorporate structural, logical, electrical, process, and other changes. Portions and features of some embodiments can be included in, or substituted for, those of other embodiments. Embodiments set forth in the claims encompass all available equivalents of those claims.

In some embodiments, mobile devices or other devices described herein can be part of a portable wireless communication device, such as a personal digital assistant (PDA), a laptop or portable computer with wireless communication capability, a web tablet, a wireless telephone, a smartphone, a wireless headset, a pager, a wearable mobile computing device (e.g., a mobile computing device included in a wearable housing), an instant messaging device, a digital camera, an access point, a television, a medical device (e.g., a heart rate monitor, a blood pressure monitor, etc.), or other device that can receive and/or transmit information wirelessly. In some embodiments, the mobile device or other device can be a user equipment (UE) or an Evolved Node-B (eNodeB) configured to operate in accordance with 3GPP standards (e.g., the 3GPP Long Term Evolution ("LTE") Advanced Release 12 (March 2014) (the "LTE-A Standard")). In some embodiments, the mobile device or other device can be configured to operate according to other protocols or standards, including IEEE 802.11 or other IEEE and 3GPP standards. In some embodiments, the mobile device or other device can include one or more of a keyboard, a display, a non-volatile memory port, multiple antennas, a graphics processor, an application processor, speakers, and other mobile device elements. The display can be a liquid crystal display (LCD) screen including a touch screen.

Figure 1:
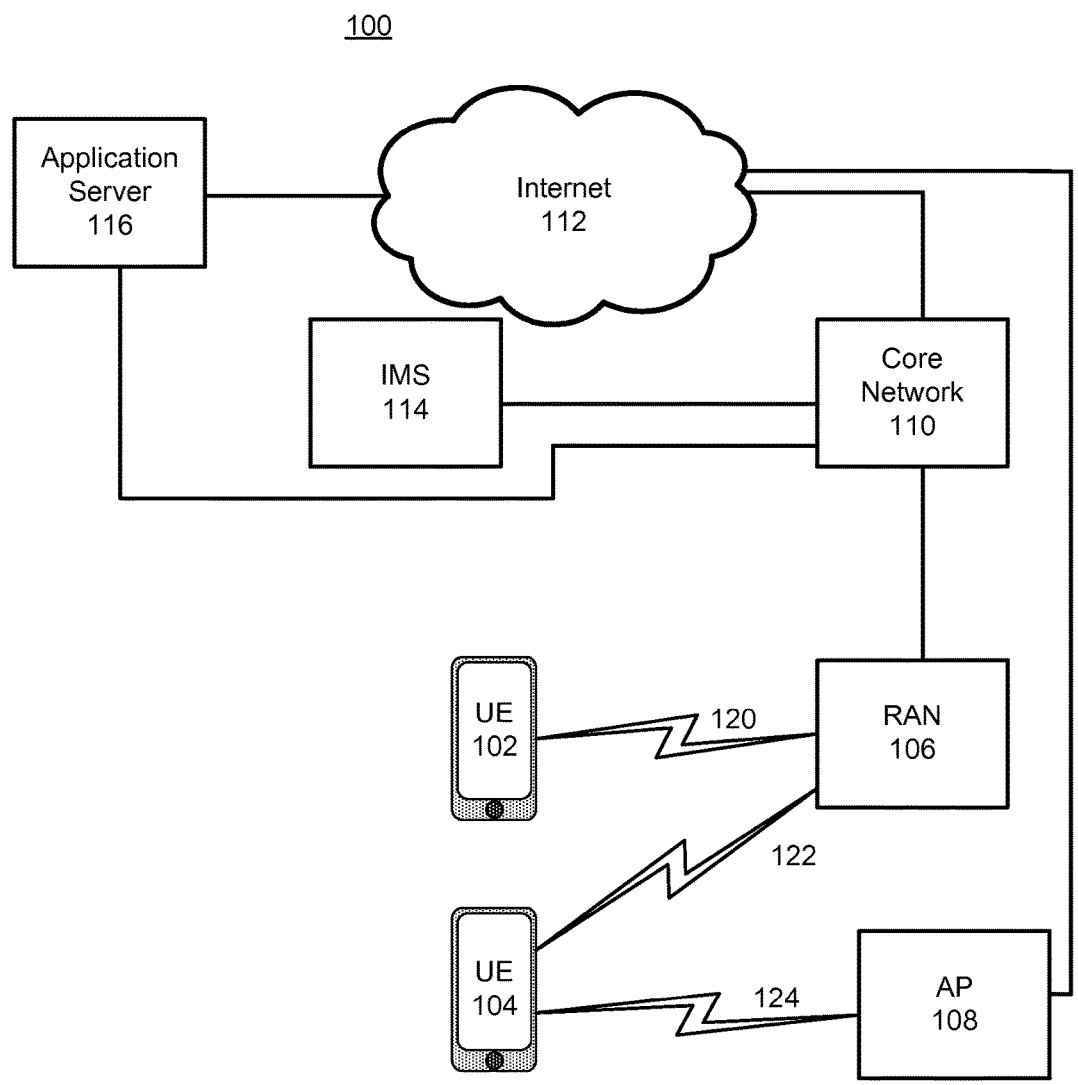
FIG. 1 illustrates an architecture of a wireless network with various components of the network, in accordance with some embodiments.

FIG. 1 illustrates an architecture of a wireless network with various components of the network, in accordance with some embodiments. A system 100 is shown to include a UE 102 and a UE 104. The UEs 102 and 104 are illustrated as smartphones (i.e., handheld touchscreen mobile computing devices connectable to one or more cellular networks), but can also include PDAs, pagers, laptop computers, desktop computers, and the like.

The UEs 102 and 104 are configured to access a radio access network (RAN) 106 via connections 120 and 122, respectively, each of which comprise a physical communications interface or layer; in this example, the connections 120 and 122 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP LTE protocol, and the like.

In some embodiments described in further detail below, any of the UEs 102 and 104 can comprise an Internet of Things (IoT) UE, which can comprise a network access layer designed for low-power IoT applications utilizing short-lived UE connections.

An IoT UE can utilize technologies such as machine-to-machine (M2M) or machine-type communications (MTC) for (machine initiated) exchanging data with an MTC server and/or device via a public land mobile network (PLMN), device-to-device (D2D) communication, sensor networks, or IoT networks. An IoT network describes interconnecting uniquely identifiable embedded computing devices (within the internet infrastructure) having short-lived connections, in addition to background applications (e.g., keep-alive messages, status updates, etc.) executed by the IoT UE.

The RAN 106 can include one or more access points that enable the connections 120 and 122. These access points (described in further detail below) can be referred to as access nodes, base stations (BSs), NodeBs, eNodeBs, and so forth, and can comprise ground stations (i.e., terrestrial access points) or satellite access points providing coverage within a geographic area (i.e., a cell). The RAN 106 is shown to be communicatively coupled to a core network 110. The core network 110 can be used to enable a packet-switched data exchange with the Internet 112 in addition to bridging circuit switched calls between the UEs 102 and 104. In some embodiments, the RAN 106 can comprise an Evolved UMTS (Universal Mobile Telecommunications System) Terrestrial Radio Access Network (E-UTRAN), and the core network 110 can comprise an Evolved Packet Core (EPC) network.

The UE 104 is shown to be configured to access an access point (AP) 108 via connection 124. The connection 124 can comprise a local wireless connection, such as a connection consistent with IEEE 802.11, wherein the AP 108 would comprise a wireless fidelity (WiFi) router. In this example, the AP 108 is shown to be connected to the Internet 112 without connecting to the core network 110.

The Internet 112 is shown to be communicatively coupled to an application server 116. The application server 116 can be implemented as a plurality of structurally separate servers or can be included in a single server. The application server 116 is shown as connected to both the Internet 112 and the core network 110; in other embodiments, the core network 110 connects to the application server 116 via the Internet 112. The application server 116 can also be configured to support one or more communication services (e.g., Voice-over-Internet Protocol (VoIP) sessions, Push to talk (PTT) sessions, group communication sessions, social networking services, etc.) for UEs that can connect to the application server 116 via the core network 110 and/or the Internet 112.

The core network 110 is further shown to be communicatively coupled to Internet Protocol (IP) Multimedia Subsystem (IMS) 114. The IMS 114 comprises an integrated network of telecommunications carriers that can enable the use of IP for packet communications, such as traditional telephony, fax, e-mail, internet access, VoIP, instant messaging (IM), videoconference sessions and video on demand (VoD), and the like.

Figure 2:
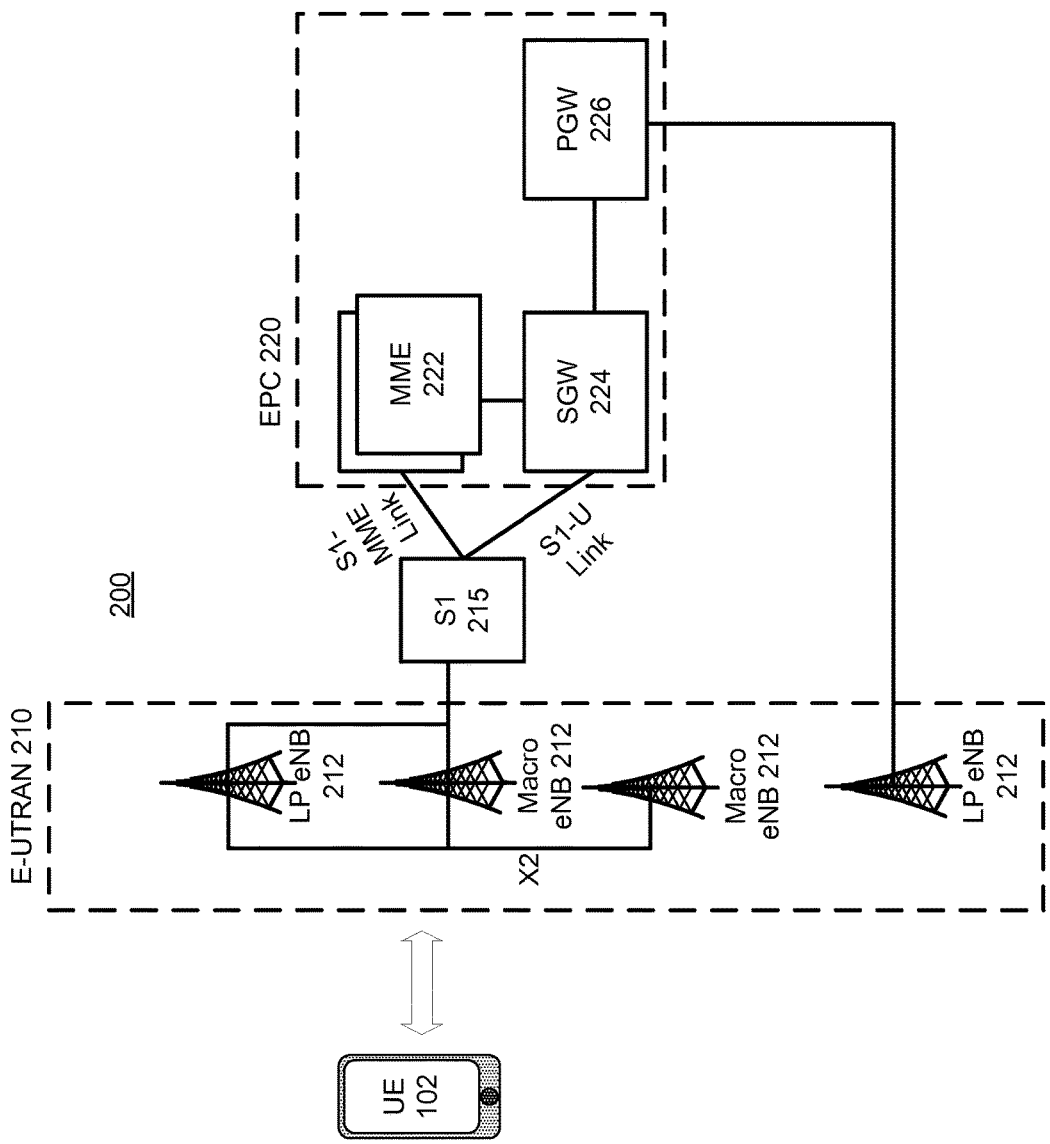
FIG. 2 illustrates an architecture of components of a cellular network, in accordance with some embodiments.

FIG. 2 illustrates an architecture of components of a cellular network, in accordance with some embodiments. In this example, (sub)system 200 comprises an Evolved Packet System (EPS) on an LTE network, and thus includes an E-UTRAN 210 and an EPC network 220 communicatively coupled via an S1 interface 215. In this illustration, only a portion of the components of E-UTRAN 210 and the EPC network 220 are shown. Some of the elements described below may be referred to as "modules" or "logic." As referred to herein, "modules" or "logic" may describe hardware (such as a circuit), software (such as a program driver), or a combination thereof (such as a programmed microprocessing unit).

The E-UTRAN 210 includes eNodeBs 212 (which can operate as base stations) for communicating with one or more UEs (e.g., the UE 102). The eNodeBs 212 are shown in this example to include macro eNodeBs and low power (LP) eNodeBs. Any of the eNodeBs 212 can terminate the air interface protocol and can be the first point of contact for the UE 102. In some embodiments, any of the eNodeBs 212 can fulfill various logical functions for the E-UTRAN 210 including but not limited to radio network controller (RNC) functions such as radio bearer management, uplink and downlink dynamic radio resource management and data packet scheduling, and mobility management. eNodeBs in EPS/LTE networks, such as the eNodeBs 212, do not utilize a separate controller (i.e., an RNC) to communicate with the EPC network 220; in other embodiments utilizing other specification protocols, RANs can include an RNC to enable communication between BSs and core networks.

In accordance with some embodiments, the UE 102 can be configured to communicate using Orthogonal Frequency-Division Multiplexing (OFDM) communication signals with any of the eNodeBs 212 over a multicarrier communication channel in accordance various communication techniques, such as an Orthogonal Frequency-Division Multiple Access (OFDMA) communication technique or a Single Carrier Frequency Division Multiple Access (SC-FDMA) communication technique, although the scope of the embodiments is not limited in this respect. The OFDM signals can comprise a plurality of orthogonal subcarriers.

In accordance with some embodiments, the UE 102 can be configured to determine a synchronization reference time based on reception of one or more signals from any of the eNodeBs 212. The UE 102 can also be configured to support device-to-device (D2D) communication with other UEs using OFDMA, SC-FDMA, or other multiple access schemes.

The S1 interface 215 is the interface that separates the E-UTRAN 210 and the EPC network 220. It is split into two parts: the S1-U, which carries traffic data between the eNodeBs 212 and the serving gateway (S-GW) 224, and the S1-MME, which is a signaling interface between the eNodeBs 212 and the mobility management entities (MMEs) 222. An X2 interface is the interface between eNodeBs 212. The X2 interface can comprise two parts (not shown): the X2-C and X2-U. The X2-C is the control plane interface between the eNodeBs 212, while the X2-U is the user plane interface between the eNodeBs 212.

With cellular networks, low power cells can be used to extend coverage to indoor areas where outdoor signals do not reach well, or to add network capacity in areas with very dense phone usage, such as train stations. As used herein, the term "LP eNodeB" refers to any suitable relatively low power eNodeB for implementing a narrower cell (i.e., narrower than a macro cell) such as a femtocell, a picocell, or a micro cell at the edge of the network. Femtocell eNodeBs are typically provided by a mobile network operator to its residential or enterprise customers. A femtocell is typically the size of a residential gateway or smaller, and generally connects to the user's broadband line. Once plugged in, the femtocell connects to the mobile operator's mobile network and provides extra coverage in a range of typically 30 to 50 meters for residential femtocells. Thus, an LP eNodeB might be a femtocell eNodeB since it is coupled through the packet data network gateway (PGW) 226. Similarly, a picocell is a wireless communication system typically covering a small area, such as in-building (offices, shopping malls, train stations, etc.) or, more recently, in-aircraft. A picocell eNodeB can generally connect through the X2 link to another eNodeB, such as a macro eNodeB, through its base station controller (BSC) functionality. Thus, an LP eNodeB can be implemented with a picocell eNodeB since it is coupled to a macro eNodeB via an X2 interface. Picocell eNodeBs or other LP eNodeBs can incorporate some or all functionality of a macro eNodeB. In some cases, this can be referred to as an AP BS or enterprise femtocell.

In some embodiments, a downlink resource grid can be used for downlink transmissions from any of the eNodeBs 212 to the UE 102, while uplink transmission from the UE 102 to any of the eNodeBs 212 can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this represents the smallest quantity of resources that currently can be allocated. There are several different physical downlink channels that are conveyed using such resource blocks.

The physical downlink shared channel (PDSCH) carries user data and higher-layer signaling to the UE 102. The physical downlink control channel (PDCCH) carries information about the transport format and resource allocations related to the PDSCH channel, among other things. It also informs the UE 102 about the transport format, resource allocation, and Hybrid Automatic Repeat Request (H-ARQ) information related to the uplink shared channel. Typically, downlink scheduling (assigning control and shared channel resource blocks to the UE 102 within a cell) is performed at any of the eNodeBs 212 based on channel quality information fed back from the UE 102 to any of the eNodeBs 212, and then the downlink resource assignment information is sent to the UE 102 on the PDCCH used for (assigned to) the UE.

The PDCCH uses control channel elements (CCEs) to convey the control information. Before being mapped to resource elements, the PDCCH complex-valued symbols are first organized into quadruplets, which are then permuted using a sub-block inter-leaver for rate matching. Each PDCCH is transmitted using one or more of these CCEs, where each CCE corresponds to nine sets of four physical resource elements known as resource element groups (REGs). Four Quadrature Phase Shift Keying (QPSK) symbols are mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

The EPC network 220 includes the MMEs 222, the S-GW 224, and a PGW 226. The MMEs 222 are similar in function to the control plane of legacy Serving General packet radio service (GPRS) Support Nodes (SGSN). The MMEs 222 manage mobility aspects in access such as gateway selection and tracking area list management. The S-GW 224 terminates the interface toward the E-UTRAN 210 and routes data packets between the E-UTRAN 210 and the EPC network 220. In addition, the S-GW 224 can be a local mobility anchor point for inter-eNodeB handovers and can also provide an anchor for inter-3GPP mobility. Other responsibilities can include lawful intercept, charging, and some policy enforcement.

The S-GW 224 and the MMEs 222 can be implemented in one physical node or separate physical nodes. The PGW 226 terminates an SGi interface toward the packet data network (PDN). The PGW 226 routes data packets between the EPC network 220 and external networks (e.g., the internet), and can be a key node for policy enforcement and charging data collection. The PGW 226 and S-GW 224 can be implemented in one physical node or separated physical nodes.

The UE 102 performs cell selection upon power-up and cell reselections throughout its operation. The UE 102 searches for a cell provided by E-UTRAN 210 (e.g., a macro cell or a picocell). During the cell reselection process, the UE 102 can measure reference signal strength for each neighboring cell (e.g., Reference Signal Received Power/Reference Signal Received Quality (RSRP/RSRQ)) and select a cell based on this measurement (e.g., select a cell with the highest RSRP value). After the UE 102 selects a cell, it can verify the accessibility of the cell by reading the master information block (MIB). If the UE 102 fails to read the MIB of the selected cell, it can discard the selected cell and repeat the above process until a suitable cell is discovered.

A radio resource control (RRC) state indicates whether an RRC layer of the UE 102 is logically connected to an RRC layer of the E-UTRAN 210. After the UE 102 is communicatively coupled to a cell (e.g., the UE can listen to eNodeB broadcast channels), its RRC state is RRC_IDLE. When the UE 102 has data packets to transmit or receive, its RRC state becomes RRC_CONNECTED. The UE 102, when in an RRC_IDLE state, can associate itself to different cells.

When a large number of wireless devices are present in a network, there may be scenarios where an end device does not have direct connectivity to an eNodeB(s) 212. For example, connectivity resources may be limited or devices may comprise coverage-constrained devices (e.g., devices operating primarily for MTC or M2M communications (e.g., sensor devices, controller devices, etc.) may have limited coverage and processing capabilities (similarly, devices may operate in a coverage constrained mode to limit power/resource consumption)). The connectivity for such a device may be provided using a multi-hop transmission path for uplink/downlink paths to/from the eNodeB(s) 212. In other examples, a multi-hop transmission path may be more power efficient or have less of a network traffic load compared to a direct UE-eNodeB path, and thus the multi-hop transmission path is utilized.

Figure 3:
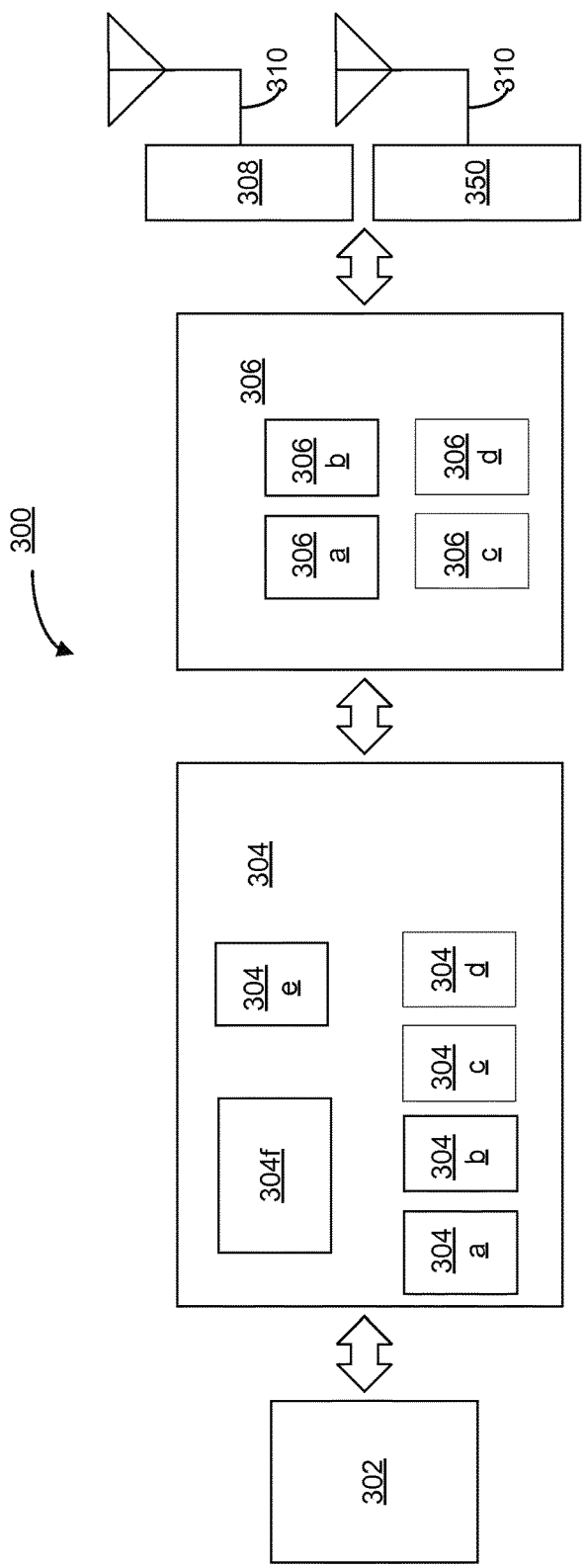
FIG. 3 illustrates example components of a user equipment in accordance with some embodiments.

FIG. 3 illustrates example components of a UE device 300 in accordance with some embodiments. In some embodiments, the UE device 300 may include application circuitry 302, baseband circuitry 304, Radio Frequency (RF) circuitry 306, front-end module (FEM) circuitry 308, a low-power wake-up receiver (LP-WUR) 350, and one or more antennas 310, coupled together at least as shown. In some embodiments, the UE device 300 may include additional elements such as, for example, memory/storage, display, camera, sensor, and/or input/output (I/O) interface.

The application circuitry 302 may include one or more application processors. For example, the application circuitry 302 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

The baseband circuitry 304 may include circuitry such as, but not limited to, one or more single-core or multi-core processors. The baseband circuitry 304 may include one or more baseband processors and/or control logic to process baseband signals received from a receive signal path of the RF circuitry 306 and to generate baseband signals for a transmit signal path of the RF circuitry 306. Baseband circuitry 304 may interface with the application circuitry 302 for generation and processing of the baseband signals and for controlling operations of the RF circuitry 306. For example, in some embodiments, the baseband circuitry 304 may include a second generation (2G) baseband processor 304a, third generation (3G) baseband processor 304b, fourth generation (4G) baseband processor 304c, and/or other baseband processor(s) 304d for other existing generations, generations in development, or to be developed in the future (e.g., fifth generation (5G), 6G, etc.). The baseband circuitry 304 (e.g., one or more of baseband processors 304a-d) may handle various radio control functions that enable communication with one or more radio networks via the RF circuitry 306. The radio control functions may include, but are not limited to, signal modulation/demodulation, encoding/decoding, radio frequency shifting, and the like. In some embodiments, modulation/demodulation circuitry of the baseband circuitry 304 may include Fast-Fourier Transform (FFT), precoding, and/or constellation mapping/demapping functionality. In some embodiments, encoding/decoding circuitry of the baseband circuitry 304 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 304 may include elements of a protocol stack such as, for example, elements of an EUTRAN protocol including, for example, physical (PHY), media access control (MAC), radio link control (RLC), packet data convergence protocol (PDCP), and/or RRC elements. A central processing unit (CPU) 304e of the baseband circuitry 304 may be configured to run elements of the protocol stack for signaling of the PHY, MAC, RLC, PDCP and/or RRC layers. In some embodiments, the baseband circuitry may include one or more audio digital signal processor(s) (DSP) 304f. The audio DSP(s) 304f may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 304 and the application circuitry 302 may be implemented together such as, for example, on a system on a chip (SOC).

In some embodiments, the baseband circuitry 304 may provide for communication compatible with one or more radio technologies. For example, in some embodiments, the baseband circuitry 304 may support communication with an E-UTRAN and/or other wireless metropolitan area networks (WMAN), a wireless local area network (WLAN), and/or a wireless personal area network (WPAN). Embodiments in which the baseband circuitry 304 is configured to support radio communications of more than one wireless protocol may be referred to as multi-mode baseband circuitry.

RF circuitry 306 may enable communication with wireless networks using modulated electromagnetic radiation through a non-solid medium. In various embodiments, the RF circuitry 306 may include switches, filters, amplifiers, and the like to facilitate the communication with the wireless network. RF circuitry 306 may include a receive signal path which may include circuitry to down-convert RF signals received from the FEM circuitry 308 and provide baseband signals to the baseband circuitry 304. RF circuitry 306 may also include a transmit signal path which may include circuitry to up-convert baseband signals provided by the baseband circuitry 304 and provide RF output signals to the FEM circuitry 308 for transmission.

In some embodiments, the RF circuitry 306 may include a receive signal path and a transmit signal path. The receive signal path of the RF circuitry 306 may include mixer circuitry 306a, amplifier circuitry 306b, and filter circuitry 306c. The transmit signal path of the RF circuitry 306 may include filter circuitry 306c and mixer circuitry 306a. RF circuitry 306 may also include synthesizer circuitry 306d for synthesizing a frequency for use by the mixer circuitry 306a of the receive signal path and the transmit signal path. In some embodiments, the mixer circuitry 306a of the receive signal path may be configured to down-convert RF signals received from the FEM circuitry 308 based on the synthesized frequency provided by synthesizer circuitry 306d. The amplifier circuitry 306b may be configured to amplify the down-converted signals, and the filter circuitry 306c may be a low-pass filter (LPF) or band-pass filter (BPF) configured to remove unwanted signals from the down-converted signals to generate output baseband signals. Output baseband signals may be provided to the baseband circuitry 304 for further processing. In some embodiments, the output baseband signals may be zero-frequency baseband signals, although this is not a requirement. In some embodiments, mixer circuitry 306a of the receive signal path may comprise passive mixers, although the scope of the embodiments is not limited in this respect.

In some embodiments, the mixer circuitry 306a of the transmit signal path may be configured to up-convert input baseband signals based on the synthesized frequency provided by the synthesizer circuitry 306d to generate RF output signals for the FEM circuitry 308. The baseband signals may be provided by the baseband circuitry 304 and may be filtered by filter circuitry 306c. The filter circuitry 306c may include a LPF, although the scope of the embodiments is not limited in this respect.

In some embodiments, the mixer circuitry 306a of the receive signal path and the mixer circuitry 306a of the transmit signal path may include two or more mixers and may be arranged for quadrature downconversion and/or upconversion respectively. In some embodiments, the mixer circuitry 306a of the receive signal path and the mixer circuitry 306a of the transmit signal path may include two or more mixers and may be arranged for image rejection (e.g., Hartley image rejection). In some embodiments, the mixer circuitry 306a of the receive signal path and the mixer circuitry 306a may be arranged for direct downconversion and/or direct upconversion, respectively. In some embodiments, the mixer circuitry 306a of the receive signal path and the mixer circuitry 306a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 306 may include analog-to-digital converter (ADC) and digital-to-analog converter (DAC) circuitry and the baseband circuitry 304 may include a digital baseband interface to communicate with the RF circuitry 306.

In some dual-mode embodiments, a separate radio integrated circuit (IC) circuitry may be provided for processing signals for each spectrum, although the scope of the embodiments is not limited in this respect.

In some embodiments, the synthesizer circuitry 306d may be a fractional-N synthesizer or a fractional N/N+1 synthesizer, although the scope of the embodiments is not limited in this respect as other types of frequency synthesizers may be suitable. For example, synthesizer circuitry 306d may be a delta-sigma synthesizer, a frequency multiplier, or a synthesizer comprising a phase-locked loop with a frequency divider.

The synthesizer circuitry 306d may be configured to synthesize an output frequency for use by the mixer circuitry 306a of the RF circuitry 306 based on a frequency input and a divider control input. In some embodiments, the synthesizer circuitry 306d may be a fractional N/N+1 synthesizer.

In some embodiments, frequency input may be provided by a voltage controlled oscillator (VCO), although that is not a requirement. Divider control input may be provided by either the baseband circuitry 304 or the application circuitry 302 depending on the desired output frequency. In some embodiments, a divider control input (e.g., N) may be determined from a look-up table based on a channel indicated by the application circuitry 302.

Synthesizer circuitry 306d of the RF circuitry 306 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump, and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 306d may be configured to generate a carrier frequency as the output frequency, while in other embodiments, the output frequency may be a multiple of the carrier frequency (e.g., twice the carrier frequency, four times the carrier frequency) and used in conjunction with a quadrature generator and divider circuitry to generate multiple signals at the carrier frequency with multiple different phases with respect to each other. In some embodiments, the output frequency may be a LO frequency (fLO). In some embodiments, the RF circuitry 306 may include an IQ/polar converter.

FEM circuitry 308 may include a receive signal path, which may include circuitry configured to operate on RF signals received from one or more antennas 310, amplify the received signals, and provide the amplified versions of the received signals to the RF circuitry 306 for further processing. FEM circuitry 308 may also include a transmit signal path, which may include circuitry configured to amplify signals for transmission provided by the RF circuitry 306 for transmission by one or more of the one or more antennas 310.

In some embodiments, the FEM circuitry 308 may include a transmission/reception (TX/RX) switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 306). The transmit signal path of the FEM circuitry 308 may include a power amplifier (PA) to amplify input RF signals (e.g., provided by RF circuitry 306), and one or more filters to generate RF signals for subsequent transmission (e.g., by one or more of the one or more antennas 310.

In some embodiments, the UE 300 comprises a plurality of power saving mechanisms. If the UE 300 is in an RRC_Connected state, where it is still connected to the eNB because it expects to receive traffic shortly, then it may enter a state known as Discontinuous Reception Mode (DRX) after a period of inactivity. During this state, the device may power down for brief intervals of time and thus save power.

If there is no data traffic activity for an extended period of time, then the UE 300 may transition off to an RRC_Idle state, where it disconnects from the network and does not perform operations such as channel quality feedback, handover, and the like. The UE 300 goes into a very low power state and it performs paging where it periodically wakes up to listen to the network and then powers down again. The device cannot receive data in this state; in order to receive data, it transitions back to RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

As discussed above, the UE device 300 may comprise a network access layer designed for low-power applications utilizing short-lived UE connections, such as a low-power IoT UE (e.g., an MTC or M2M device). IoT UEs may be utilized in applications having a potentially high latency in downlink transmissions (i.e., the device may power down completely for large periods of time to save power and may be unavailable to the network). Additionally, there may be other use cases which require the device to consume a very low amount of power, but also be reachable within a few hundred milliseconds by the network.

Current solutions that allow for a device to be reachable within said time frame use a paging mechanism and thus are not low-power solutions. Paging describes waking up a radio device every fixed interval (e.g., every 2.56 seconds) in order to check with the network whether there is any downlink data waiting for the device. Paging may unnecessarily consume device power if there is no downlink data waiting, which is frequently the case. Thus, for a majority of time, the paging mechanism initiates a device power up/power down simply for a check.

In this embodiment, the LP-WUR 350 is a low-power radio separate from the FEM 308. The LP-WUR 350 may remain awake continuously (or at high-frequency intervals) and monitor for a wakeup signal, allowing the FEM 308 to remain powered down in the absence of downlink data. When the LP-WUR 350 detects the wakeup signal, the LP-WUR 350 may be configured to wake up the FEM 308 to receive incoming downlink data.

In some embodiments, a simple radio waveform (e.g., a narrow-band wake-up signal comprising an on-off key (OOK) modulated tone) may be used to signal pending downlink data for the UE 300, rather than a highly complex OFDM having the precise synchronization characteristics of a standard LTE channel. This simple waveform allows for the LP-WUR 350 to remain awake and still consume less power than the FEM 308, thereby significantly increasing the battery life of the UE 300.

Figure 4:
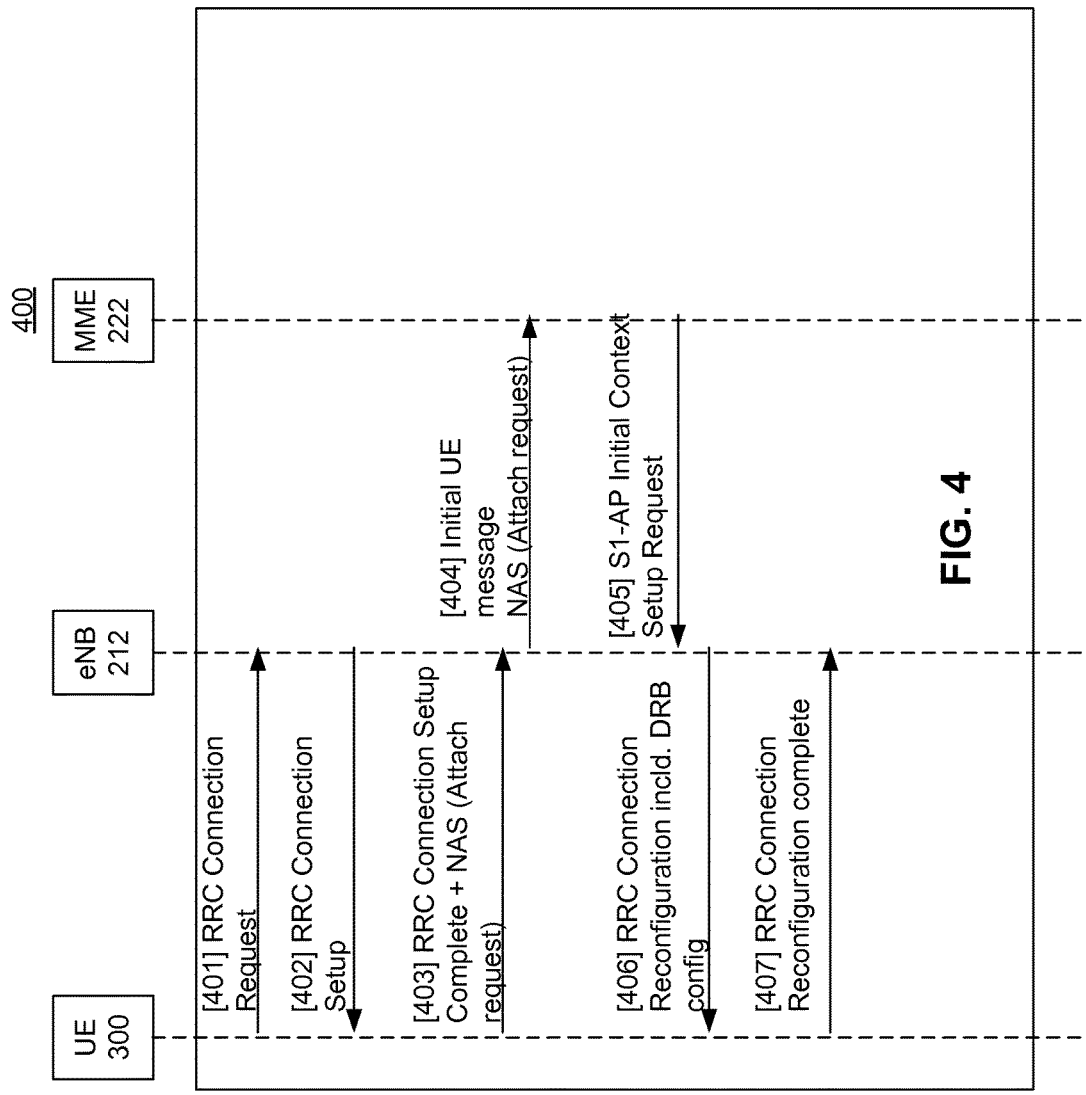
FIG. 4 is a flow diagram of a connectivity procedure for a user equipment in accordance with some embodiments.

FIG. 4 is a flow diagram of a connectivity procedure for a UE in accordance with some embodiments. Process and logical flow diagrams as illustrated herein provide examples of sequences of various process actions. Although shown in a particular sequence or order, unless otherwise specified, the order of the actions can be modified. Thus, the described and illustrated implementations should be understood only as examples, and the illustrated processes can be performed in a different order, and some actions can be performed in parallel. Additionally, one or more actions can be omitted in various embodiments; thus, not all actions are executed in every implementation. Other process flows are possible.

In this embodiment, an RRC signaling mechanism is used to exchange LP-WUR capability information of the UE 300 with other components of an LTE network. A process 400 is illustrated as an attachment messaging sequence, and is shown to include several messages exchanged between network components for establishing an RRC Connection; in some embodiments, other messages may be exchanged in addition to the messages described below.

The UE 300 sends an RRC connection request message 401 to the eNodeB 212. The eNodeB 212 sends an RRC Connection Setup message 402 to the UE 300; this message 402 includes configuration information for a signal radio bearer (SRB).

The UE 300 sends an RRC Connection Setup Complete message 403, which includes a non-access stratum (NAS) service request for attaching to an EPC, to the eNodeB 212. The message 403 can include data indicating the UE 300 has LP-WUR capability (i.e., the UE 300 includes the LP-WUR 350).

The eNodeB 212 forwards the service request message (shown as a message 404, which also includes the data indicating that the UE 300 includes the LP-WUR 350) to a network control entity of an EPC (in this example, the MME 222). In some embodiments, if rejection of the connection request is taken care of by another message, uplink (UL) grant can simply be sent in the PDCCH and message 404 is not sent.

The MME 222 sends an initial context setup request message 405 to the eNodeB 212. The message 405 can includes information from an authentication security routine. The eNodeB 212 sends an RRC Connection Reconfiguration message 406, which includes configuration information for one or more data radio bearers (DRBs), to the UE 300. The UE 300 sends an RRC Connection Reconfiguration Complete message 407 to the eNodeB 212 to establish one or more DRBs.

Thus, the MME 222 and the eNodeB 212 are aware that the UE 300 has LP-WUR capabilities, and may be reached through LP-WUR signals when the FEM 308 of the UE 300 is in an RRC_Idle state. Other embodiments may signal this information to components of the network (e.g., via Feature Group Indicator (FGI) bits in the ueCapability Information response).

Figure 5:
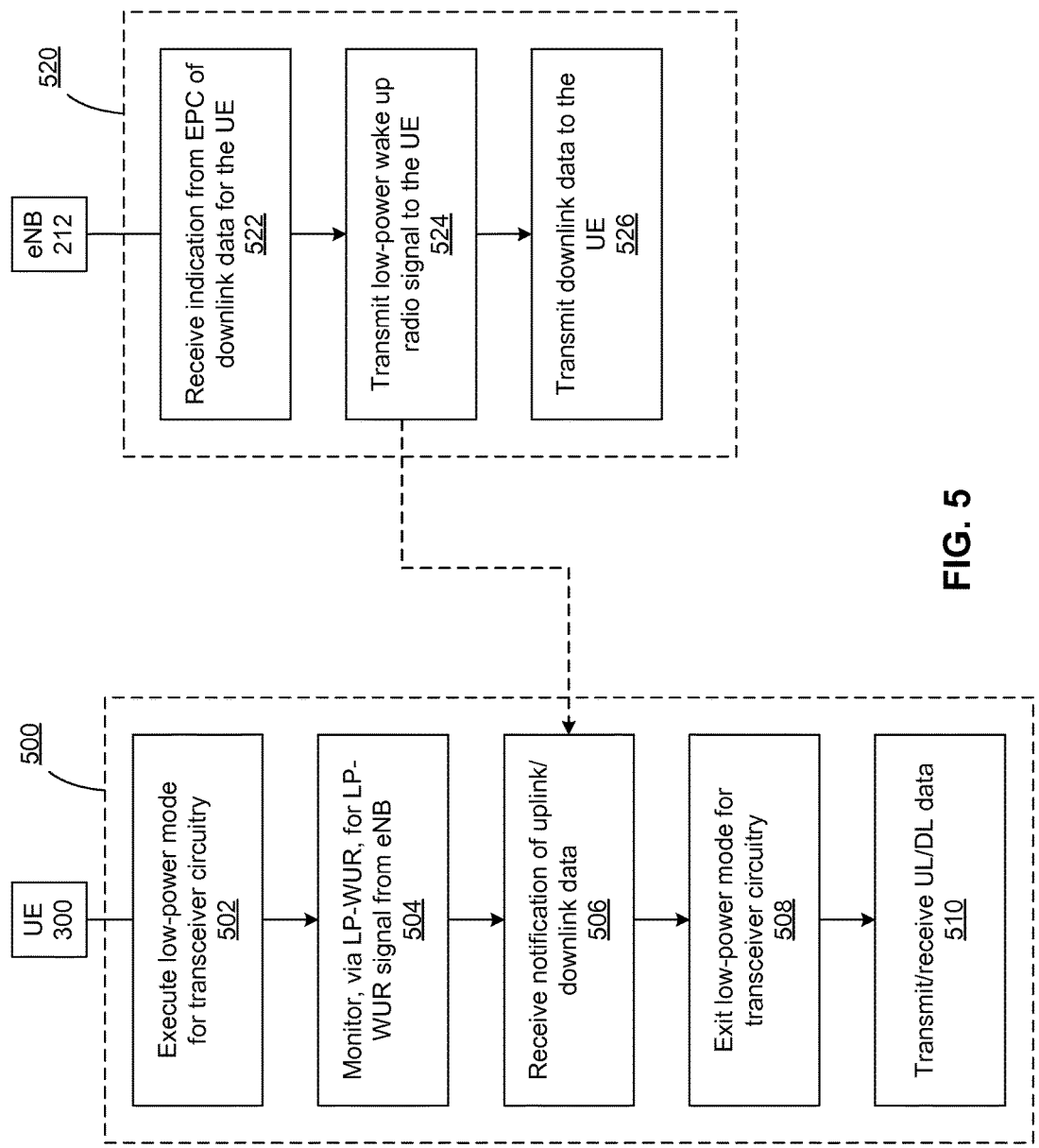
FIG. 5 illustrates a process for initiating and terminating a user equipment low power mode in accordance with some embodiments.

FIG. 5 illustrates a process for initiating and terminating the UE low power mode in accordance with some embodiments. A process 500 is shown to be executed via the UE 300 comprising the LP-WUR 350, and a process 520 is shown to be executed via the eNodeB 212. The process 500 includes an operation for the UE 300 to execute a low power mode (shown as block 502). As discussed above, if there is no data traffic activity for an extended period of time, then the UE 300 may transition off to an RRC_Idle state, where it disconnects from the network and does not perform operations such as channel quality feedback, handover, and the like. The UE 300 goes into a very low power state wherein transceiver circuitry such as the FEM 308 is powered off.

For UEs utilized in an IoT/MTC application, high latency (e.g., every few minutes to hours) in uplink/downlink transmissions may be expected (i.e., the device may power down completely for large periods of time to save power and may be unavailable to the network). The process 500 includes an operation for the LP-WUR 350 to monitor (either continuously or at an interval to ensure a minimum latency threshold) for an LP-WUR signal from the eNodeB 212 (shown as block 504)

The process 520 includes an operation for the eNodeB 212 to receive an indication from the EPC that downlink data is present for the UE 300 (shown as block 522). Because the eNodeB 212 is aware that the UE 300 includes the LP-WUR 350, the eNodeB 212 executes an operation to transmit a low-power wake-up radio signal to the UE 300 (shown as block 524) rather than executing a legacy paging process. The eNodeB 212 subsequently transmits said downlink data (shown as block 526) (e.g., after a predetermined time period, after receiving an indication from the UE 300 that its receiver circuitry is powered on, etc.).

As discussed above, the low-power wake up radio signal transmitted from the eNodeB 212 may comprise a non-OFDM signal with an extremely simple modulation scheme such as OOK. In some embodiments, the low-power wake up radio signal may include an identifying preamble pattern long enough to ensure that it can be recognized as a LP-WUR signal by the LP-WUR 350 of the UE 300. In some embodiments, the low-power wake up radio signal may include a UE Identifier, such as a system architecture evolution (SAE)-Temporary Mobile Subscriber Identity (S-TMSI), which may be used to uniquely identify the UE. In some embodiments, the low-power wake up radio signal may be transmitted so that it does not interfere with the reception of Primary and Secondary Synchronization Signals sent by the eNB to the UEs, pilot signals, or any of the control information. In some embodiments, the low-power wake up radio signal may carry some information to the UE 300 to assist in the fast network entry (e.g. preamble for non-contention based random access)

The process 500 includes an operation for the UE 300 to receive an indication of either uplink data or downlink data (i.e., via the low-power wake-up radio signal) (shown as block 506). The transceiver circuitry (e.g., the FEM 308 of the UE 300) is subsequently powered on (shown as block 508) and the uplink/downlink data is subsequently transmitted/received (shown as block 510).

Figure 6:
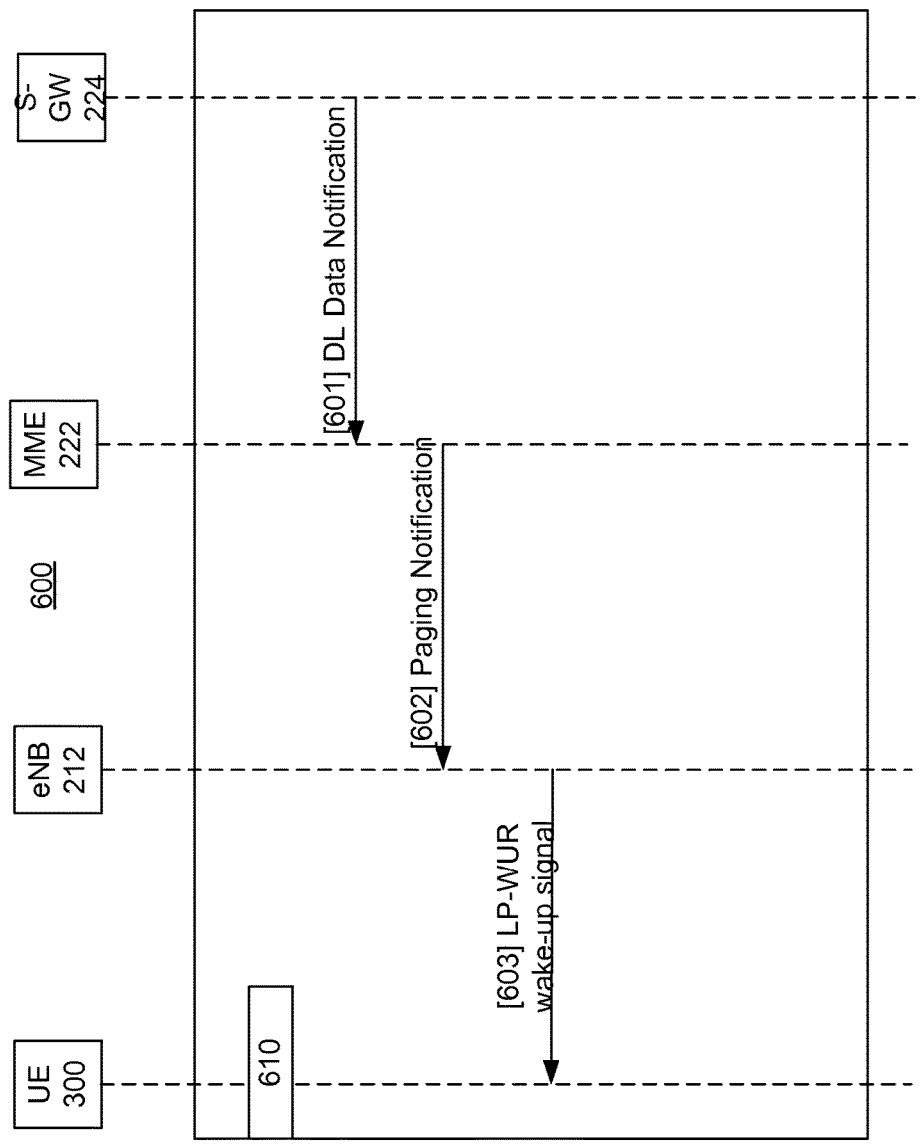
FIG. 6 is a flow diagram for a process to send downlink data to a user equipment having low-power wake up radio capabilities in accordance with some embodiments.

FIG. 6 is a flow diagram for a process to send downlink data to a UE having LP-WUR capabilities in accordance with some embodiments. A process 600 is executed while the UE 300 is executing an RRC_IDLE state 610. During this state, there is no active connection between the eNodeB 212 and the UE 300, and thus, the eNB 212 does not have information that the UE 300 is within its cell range.

The process 600 includes an operation for the S-GW 224 to transmit a downlink data notification to the MME 222 (shown as operation 601). The MME 222 determines where the UE 300 may currently located (i.e., its tracking area (TA)) and pages all eNBs that the UE 300 (UE (identified, for example, via its IMSI or S-TMSI) has downlink data (shown as operation 602); in this embodiment, the eNB 212 receives this paging notification because the UE 300 is within its cell range.

For UEs without LP-WUR capabilities, the MME 222 may send an S1-AP paging message (via, for example, the S1 interface 215 of FIG. 2) to eNB 212 in order initiate a UE legacy wake-up process. In this embodiment, however, the MME 222 sends a paging notification including data indicating the UE 300 has LP-WUR capabilities. The eNB 212 subsequently sends a LP-WUR wake-up signal (shown as operation 603) rather than a legacy paging message to initiate any of the UE wake-up processes discussed above.

Figure 7A:
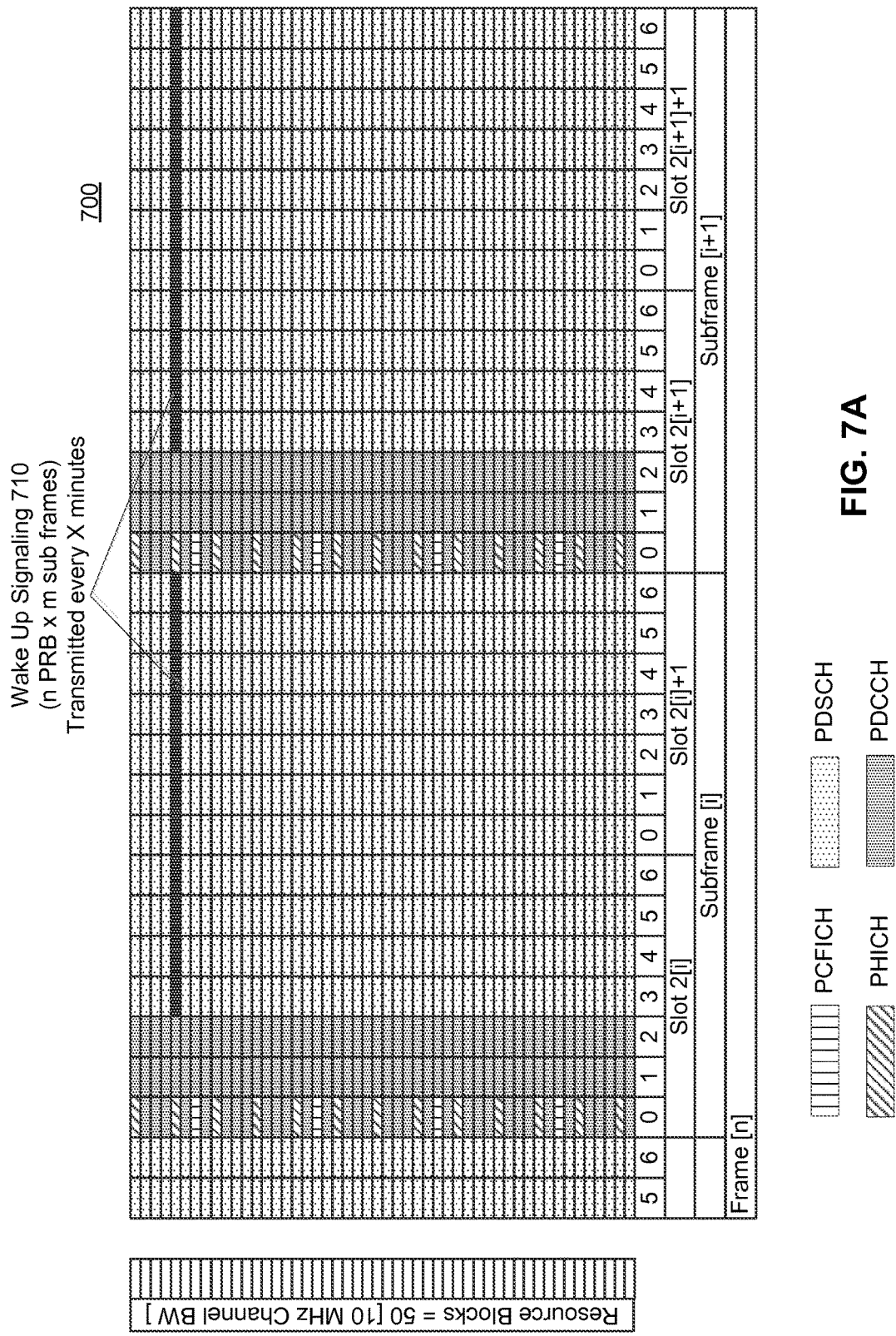
FIGS. 7A and 7B are illustrations of low-power wake up radio wake-up signal configurations in accordance with some embodiments.
Figure 7B:
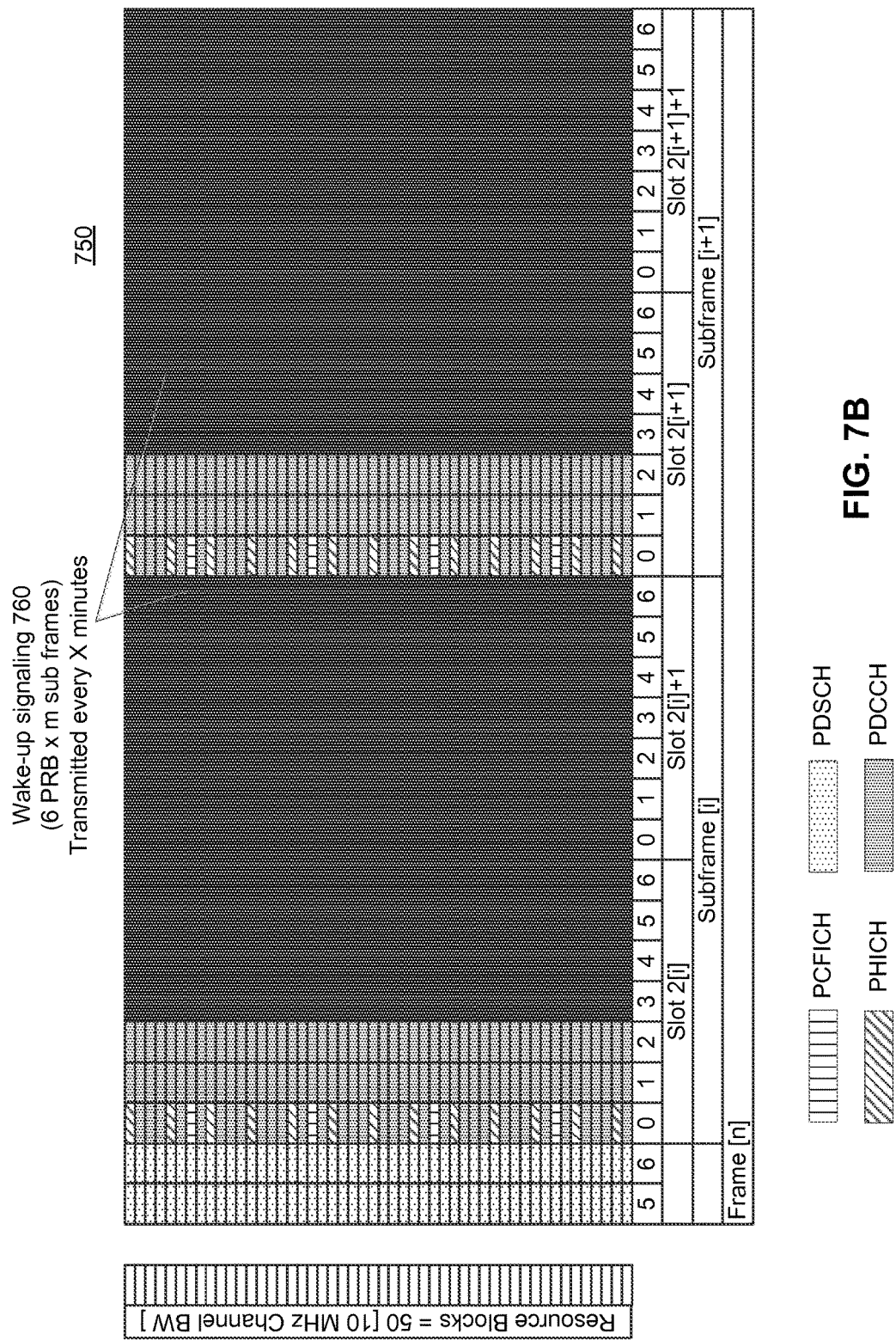

FIG. 7A and FIG. 7B are illustrations of LP-WUR wake-up signal configurations in accordance with some embodiments. A downlink signal configuration 700 is illustrated in FIG. 7A, including primary synchronization channel (P-SCH) and secondary synchronization channel (S-SCH) signals. The downlink signal configuration 700 includes physical resource blocks (PRBs) allocated for a Physical Control Format Indicator Channel (PCFICH), a Physical HARQ Indication channel (PHICH), a PDSCH and a PDCCH. Other downlink channel signals may be included in other embodiments (e.g., Physical Broadcast Channel (PBCH) signal data).

In this embodiment, a LP-WUR wake up signal configuration 710 is shown as using a limited amount of PRBs in a fixed location of the primary band. As shown in this embodiment, the LP-WUR wake up signal configuration 710 comprises n PRBs×m subframes, which may be transmitted every X minutes (dependent on the expected latency of the UE; as discussed above, IoT UEs may have a high expected latency).

Other LP-WUR wake up signal configurations may be used in other embodiments. For example, a downlink signal configuration 750 is illustrated in FIG. 7B as including a LP-WUR wake up signal configuration 760 that uses a narrow frequency channel. In this example, the LP-WUR wake up signal configuration 760 comprises a low number of PRBs (in this example, 6 PRBs)×m subframes, which may be transmitted every X minutes if no response from the UE is received (dependent on the expected latency of the UE). Other examples not illustrated include LP-WUR wake up signal configurations included in a pre-determined Out-of-band (OOB) or in the guard bands of primary or secondary bands. These example configurations allow for an extremely simple, yet uniquely identifiable LP-WUR wake-up radio signal such that the power costs of receiving and decoding it correctly over mobile broadband may be extremely low.

Figure 8:
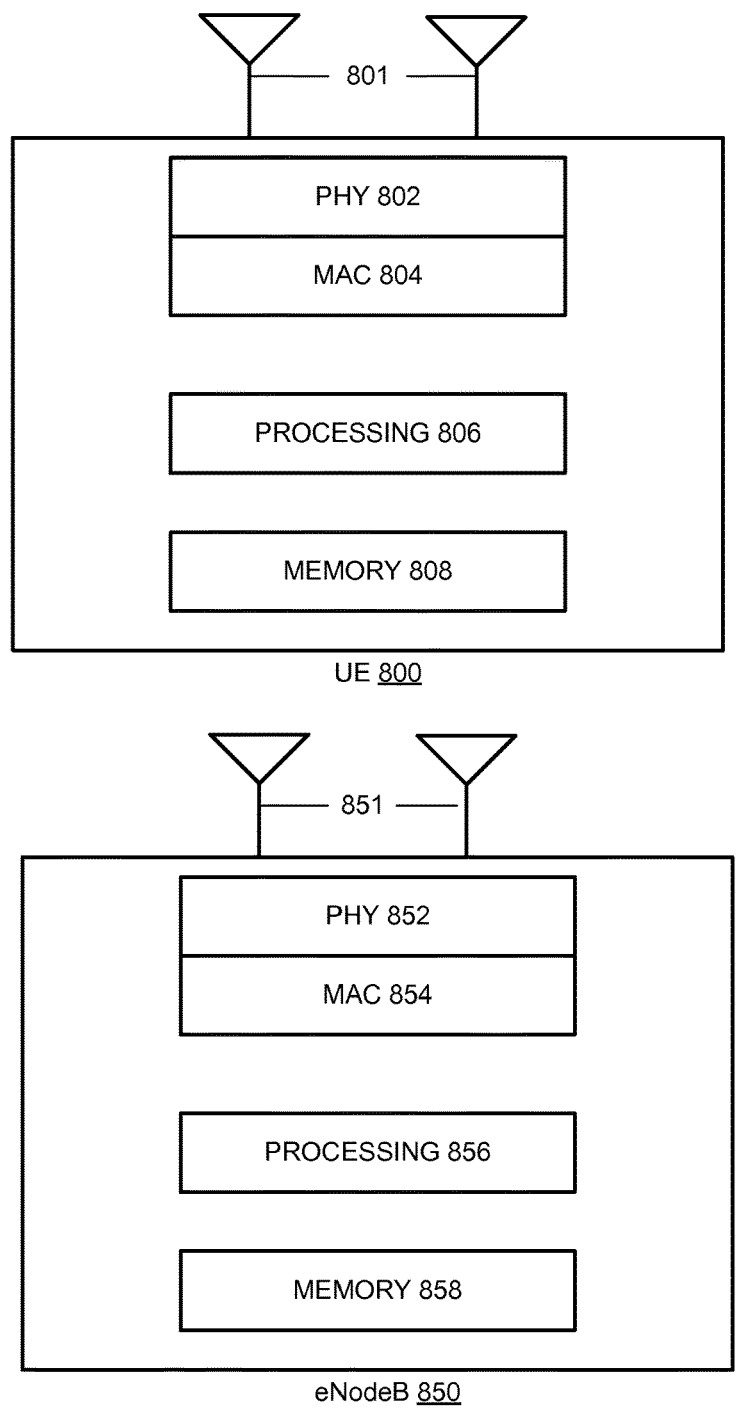
FIG. 8 shows a block diagram of a user equipment and an eNodeB in accordance with some embodiments.

FIG. 8 shows a block diagram of a UE 800 and an eNodeB 850, in accordance with some embodiments. It should be noted that in some embodiments, the eNodeB 850 can be a stationary (non-mobile) device. The UE 800 can include PHY 802 for transmitting and receiving signals to and from the eNodeB 850, other eNodeBs, other UEs, or other devices using one or more antennas 801, while the eNodeB 850 can include PHY 852 for transmitting and receiving signals to and from the UE 800, other eNodeBs, other UEs, or other devices using one or more antennas 851. The UE 800 can also include MAC circuitry 804 for controlling access to the wireless medium, while the eNodeB 850 can also include MAC circuitry 854 for controlling access to the wireless medium. The UE 800 can also include processing circuitry 806 and memory 808 arranged to perform the operations described herein, and the eNodeB 850 can also include processing circuitry 856 and memory 858 arranged to perform the operations described herein.

The antennas 801, 851 can comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas 801, 851 can be effectively separated to benefit from spatial diversity and the different channel characteristics that can result.

Although the UE 800 and eNodeB 850 are each illustrated as having several separate functional elements, one or more of the functional elements can be combined and can be implemented by combinations of software-configured elements, such as processing elements including digital signal processors (DSPs), and/or other hardware elements. For example, some elements can comprise one or more microprocessors, DSPs, field-programmable gate arrays (FPGAs), application specific integrated circuits (ASICs), radio-frequency integrated circuits (RFICs), and combinations of various hardware and circuitry for performing at least the functions described herein. In some embodiments, the functional elements can refer to one or more processes operating on one or more processing elements.

Embodiments can be implemented in one or a combination of hardware, firmware, and software. Embodiments can also be implemented as instructions stored on a computer-readable storage device, which can be read and executed by at least one processor to perform the operations described herein. A computer-readable storage device can include any non-transitory mechanism for storing information in a form readable by a machine (e.g., a computer). For example, a computer-readable storage device can include read-only memory (ROM), random-access memory (RAM), magnetic disk storage media, optical storage media, flash-memory devices, and other storage devices and media. Some embodiments can include one or more processors and can be configured with instructions stored on a computer-readable storage device.

Figure 9:
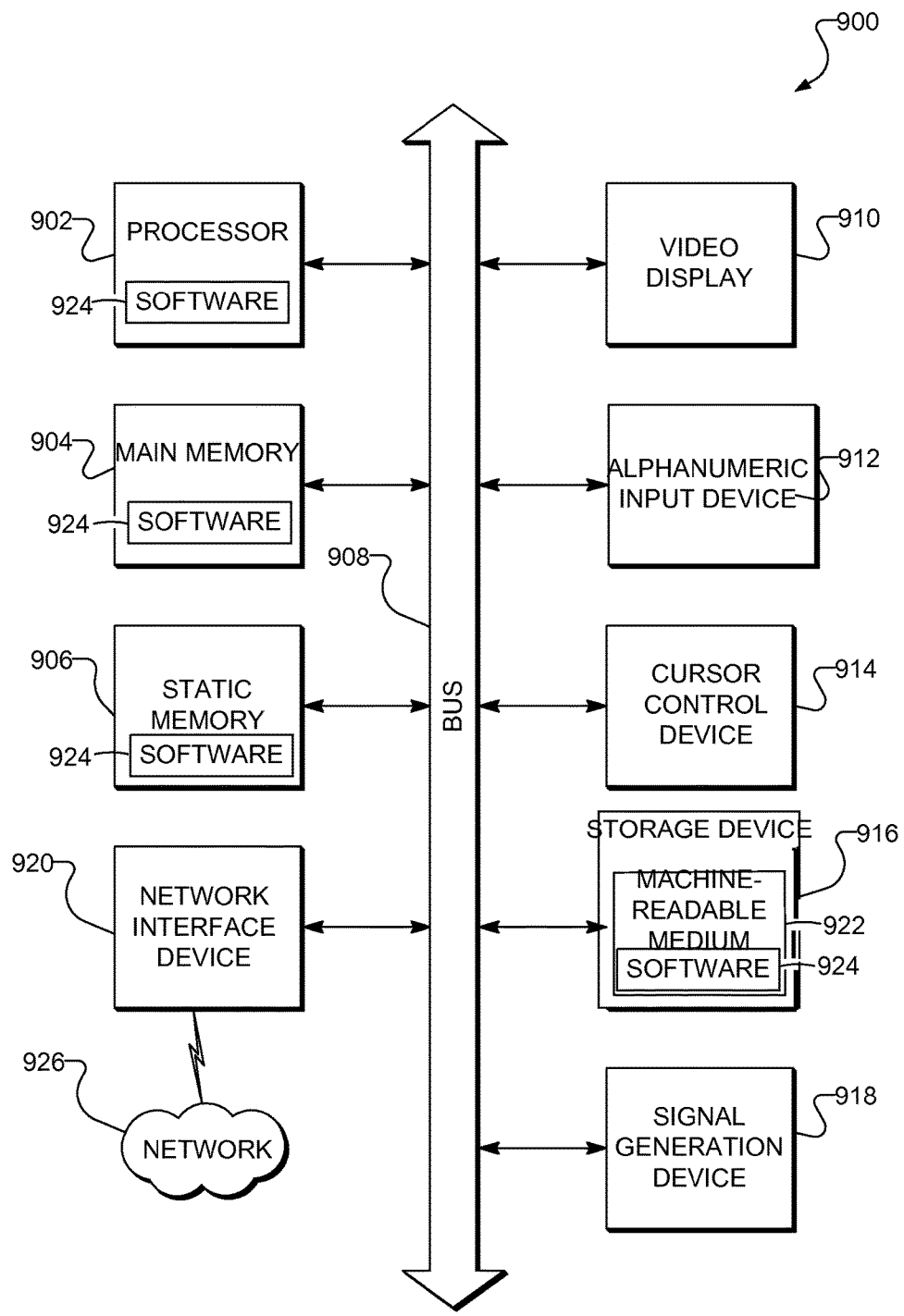
FIG. 9 is a block diagram illustrating components of a machine, according to some example embodiments, able to read instructions from a machine-readable medium and perform any one or more of the methodologies discussed herein, according to aspects of the disclosure.

FIG. 9 is a block diagram illustrating components of a machine, according to some example embodiments, able to read instructions from a machine-readable medium and perform any one or more of the methodologies discussed herein, according to aspects of the disclosure. In particular, FIG. 9 illustrates an exemplary computer system 900 (which can comprise any of the network elements discussed above) within which software 924 for causing the machine to perform any one or more of the methodologies discussed herein can be executed. In alternative embodiments, the machine operates as a standalone device or can be connected (e.g., networked) to other machines. In a networked deployment, the machine can operate in the capacity of a server or a client machine in a server-client network environment, or as a peer machine in a peer-to-peer (or distributed) network environment. The computer system 900 can function as any of the above described UEs or eNodeBs, and can be a personal computer (PC), a wearable mobile computing device, a tablet PC, a set-top box (STB), a PDA, a cellular telephone, a web appliance, a network router, switch or bridge, or any machine capable of executing instructions (sequential or otherwise) that specify actions to be taken by that machine. Further, while only a single machine is illustrated, the term "machine" can also be taken to include any collection of machines that individually or jointly execute a set (or multiple sets) of instructions to perform any one or more of the methodologies discussed herein.

The example computer system 900 includes a processor 902 (e.g., a CPU, a graphics processing unit (GPU), or both), a main memory 904, and a static memory 906, which communicate with each other via a bus 908. The computer system 900 can further include a video display unit 910 (e.g., a LCD or a cathode ray tube (CRT)). The computer system 900 also includes an alphanumeric input device 912 (e.g., a keyboard), a user interface navigation (or cursor control)

device 914 (e.g., a mouse), a storage device 916, a signal generation device 918 (e.g., a speaker), and a network interface device 920.

The storage device 916 includes a non-transitory machine-readable medium 922 on which is stored one or more sets of data structures and software 924 embodying or utilized by any one or more of the methodologies or functions described herein. The software 924 can also reside, completely or at least partially, within the main memory 904 and/or within the processor 902 during execution thereof by the computer system 900, with the main memory 904 and the processor 902 also constituting non-transitory, machine-readable media 922. The software 924 can also reside, completely or at least partially, within the static memory 906.

While the non-transitory machine-readable medium 922 is shown in an example embodiment to be a single medium, the term "machine-readable medium" can include a single medium or multiple media (e.g., a centralized or distributed database, and/or associated caches and servers) that store the one or more software 924 or data structures. The term "machine-readable medium" can also be taken to include any tangible medium that is capable of storing, encoding, or carrying instructions for execution by the machine and that cause the machine to perform any one or more of the methodologies of the present embodiments, or that is capable of storing, encoding or carrying data structures utilized by or associated with such instructions. The term "machine-readable medium" can accordingly be taken to include, but not be limited to, solid-state memories, and optical and magnetic media. Specific examples of machine-readable media 922 include non-volatile memory, including by way of example semiconductor memory devices (e.g., erasable programmable read-only Memory (EPROM), electrically erasable programmable read-only memory (EEPROM), and flash memory devices); magnetic disks such as internal hard disks and removable disks; magneto-optical disks; and compact disc-read-only memory (CD-ROM) and digital versatile disc (or digital video disc) read-only memory (DVD-ROM) disks.

The software 924 can further be transmitted or received over a communications network 926 using a transmission medium. The software 924 can be transmitted using the network interface device 920 and any one of a number of well-known transfer protocols (e.g., HyperText Transfer Protocol (HTTP)). Examples of communication networks include a local area network (LAN), a wide area network (WAN), the internet, mobile telephone networks, plain old telephone service (POTS) networks, and wireless data networks (e.g., WiFi and WiMax networks). The term "transmission medium" can be taken to include any intangible medium capable of storing, encoding, or carrying instructions for execution by the machine, and includes digital or analog communications signals or other intangible media to facilitate communication of such software 924.

The drawings and the forgoing description gave examples of the present disclosure. Although depicted as a number of disparate functional items, those skilled in the art will appreciate that one or more of such elements can well be combined into single functional elements. Alternatively, certain elements can be split into multiple functional elements. Elements from one embodiment can be added to another embodiment. For example, orders of processes described herein can be changed and are not limited to the manner described herein. Moreover, the actions of any flow diagram need not be implemented in the order shown; nor do all of the acts necessarily need to be performed. Also, those acts that are not dependent on other acts can be performed in parallel with the other acts. The scope of the present disclosure, however, is by no means limited by these specific examples. Numerous variations, whether explicitly given in the specification or not, such as differences in structure, dimension, and use of material, are possible. The scope of the disclosure is at least as broad as given by the following claims.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

Some embodiments described a user equipment (UE) comprising a first receiver comprising a low power wake-up receiver (LP-WUR) to monitor a downlink channel for a LP-WUR wake-up signal from an eNodeB, the LP-WUR wake-up signal to comprise a narrow-band signal, and a second receiver comprising a front end module (FEM), separate from the LP-WUR, to monitor a physical downlink control channel (PDCCH). The FEM may comprise transmission circuitry to transmit signal data to the eNodeB indicating the UE includes the LP-WUR, circuitry to execute a power saving mode (PSM) for the FEM to cease monitoring the PDCCH in response to a period of inactivity, and circuitry to exit the PSM for the FEM to monitor the PDCCH in response to the LP-WUR receiving the LP-WUR wake-up signal from the eNodeB.

In some embodiments, the LP-WUR is to monitor a fixed physical resource block (PRB) location on the downlink channel allocated for the LP-WUR wake-up signal. In some embodiments, the LP-WUR wake-up signal is modulated according to an on-off keying (OOK) tone. In some embodiments, the fixed PRB location is included in a primary frequency band. In some embodiments, the fixed PRB location is included in a secondary frequency band.

In some embodiments, the LP-WUR wake up signal further includes a system architecture evolution (SAE)-Temporary Mobile Subscriber Identity (S-TMSI) identifying the UE. In some embodiments, the LP-WUR is to monitor the downlink channel for the LP-WUR wake-up signal periodically according to a first time interval, and the FEM further comprises circuitry to execute a discontinuous reception (DRX) mode for monitoring the PDCCH according to a second time interval, the second time interval less than the first time interval.

In some embodiments, the UE further comprises one or more antennas communicatively coupled to the LP-WUR for monitoring the downlink channel for the LP-WUR wake-up signal from the eNodeB, and communicatively coupled to the FEM to transmit the signal to the eNodeB indicating the UE includes the LP-WUR. In some embodiments, the UE comprises a machine-type communications (MTC) device. In some embodiments, the one or more antennas comprise a first antenna for monitoring the downlink channel for the LP-WUR wake-up signal from the eNodeB, and an antenna to transmit the signal to the eNodeB indicating the UE includes the LP-WUR module.

Some embodiments describe a non-transitory computer-readable storage medium comprising contents, which when executed by a computing system, cause the computing system to perform operations to generate signal data to be transmitted to an eNodeB indicating a user equipment (UE) includes low power wake-up radio (LP-WUR), execute a power saving mode (PSM) for a front end module (FEM) of the UE to cease monitoring a physical downlink control channel (PDCCH) in response to a period of inactivity, and exit the PSM for the FEM in response to the LP-WUR receiving an LP-WUR wake-up signal from an eNodeB via a downlink channel.

In some embodiments, the operations further comprise operations to execute a discontinuous reception (DRX) mode for monitoring the PDCCH according to a first time interval, wherein the LP-WUR is to monitor the downlink channel for the LP-WUR wake-up signal periodically according to a second time interval, the second time interval greater than the first time interval.

In some embodiments, the UE comprises a machine-type communications (MTC) device. In some embodiments, the UE comprises a cellular Internet of Things (CIoT) UE.

Some embodiments describe an apparatus for eNodeB comprising receiver circuitry configured to receive signal data from a mobility management entity (MME) of an evolved packet core (EPC) network identifying downlink data for a user equipment (UE), and receive signal data from the MME indicating the UE includes a low power wake-up receiver (LP-WUR) and indicating the LP-WUR of the UE is to exit a power saving mode (PSM), and transmission circuitry configured to transmit a wake-up signal to the LP-WUR of the UE for the UE to exit the PSM.

In some embodiments, the signal data indicating the LP-WUR of the UE is to exit the PSM transmitted to the UE is to be modulated according to an on-off keying (OOK) tone. In some embodiments, the signal data indicating the LP-WUR module of the UE is to exit the PSM comprises an LP-WUR wake-up signal to be included in a pre-determined physical resource block (PRB) location allocated for the LP-WUR wake-up signal, the pre-determined PRB location to comprise at least one of a location within a long term evolution (LTE) frequency band, or a location outside the LTE frequency band.

In some embodiments, the fixed PRB location is included in a primary frequency band. In some embodiments, the fixed PRB location is included in a secondary frequency band. In some embodiments, the signal data indicating the LP-WUR module of the UE is to exit the PSM comprises an LP-WUR wake-up signal to be included in a narrow frequency band of a downlink channel. In some embodiments, the signal data received from the MME of the EPC network indicating the LP-WUR of the UE is to exit the PSM comprises a system architecture evolution (SAE)-Temporary Mobile Subscriber Identity (S-TMSI) identifying the UE.

In some embodiments, the wake-up signal further includes data for assisting the UE in fast network entry. In some embodiments, the data comprises a preamble for non-contention based random access.

The invention claimed is:

1. A user equipment (UE) comprising:
   a first receiver comprising a low power wake-up receiver (LP-WUR) to monitor a downlink channel for a LP-WUR wake-up signal from an eNodeB, the LP-WUR wake-up signal to comprise a narrow-band signal; and
   a second receiver comprising a front end module (FEM), separate from the LP-WUR, to monitor a physical downlink control channel (PDCCH), the FEM comprising:
   transmission circuitry to transmit signal data to the eNodeB indicating the UE includes the LP-WUR;
   circuitry to execute a power saving mode (PSM) for the FEM to cease monitoring the PDCCH in response to a period of inactivity; and
   circuitry to exit the PSM for the FEM to monitor the PDCCH in response to the LP-WUR receiving the LP-WUR wake-up signal from the eNodeB.

2. The UE of claim 1, wherein the LP-WUR is to monitor a fixed physical resource block (PRB) location on the downlink channel allocated for the LP-WUR wake-up signal.

3. The UE of claim 2, wherein the LP-WUR wake-up signal is modulated according to an on-off keying (OOK) tone.

4. The UE of claim 2, wherein the fixed PRB location is included in a primary frequency band.

5. The UE of claim 2, wherein the fixed PRB location is included in a secondary frequency band.

6. The UE of claim 1, wherein the LP-WUR wake up signal further includes a system architecture evolution (SAE)-Temporary Mobile Subscriber Identity (S-TMSI) identifying the UE.

7. The UE of claim 1, wherein the LP-WUR is to monitor the downlink channel for the LP-WUR wake-up signal periodically according to a first time interval, and the FEM further comprises circuitry to execute a discontinuous reception (DRX) mode for monitoring the PDCCH according to a second time interval, the second time interval less than the first time interval.

8. The UE of claim 1, further comprising:
   one or more antennas communicatively coupled to the LP-WUR for monitoring the downlink channel for the LP-WUR wake-up signal from the eNodeB, and communicatively coupled to the FEM to transmit the signal to the eNodeB indicating the UE includes the LP-WUR.

9. The UE of claim 8, wherein the UE comprises a machine-type communications (MTC) device.

10. The UE of claim 8, wherein the one or more antennas comprise a first antenna for monitoring the downlink channel for the LP-WUR wake-up signal from the eNodeB, and an antenna to transmit the signal to the eNodeB indicating the UE includes the LP-WUR module.

* * * * *